US012172873B2

(12) United States Patent
Cordell

(10) Patent No.: US 12,172,873 B2
(45) **Date of Patent: *Dec. 24, 2024**

(54) SELF-MAINTAINING CRANE SYSTEM WITHIN A HOSTILE ENVIRONMENT

(71) Applicant: David R. Cordell & Associates, Inc., Chalfont, PA (US)

(72) Inventor: Steven R. Cordell, Silverdale, PA (US)

(73) Assignee: David R. Cordell & Associates, Inc., Chalfont, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,173

(22) Filed: Oct. 16, 2023

(65) Prior Publication Data

US 2024/0043248 A1 Feb. 8, 2024

Related U.S. Application Data

(60) Continuation of application No. 18/117,530, filed on Mar. 6, 2023, now Pat. No. 11,834,306, which is a (Continued)

(51) Int. Cl.

*B66C 13/48* (2006.01)
*B66C 11/00* (2006.01)
*B66C 13/00* (2006.01)
*B66C 13/22* (2006.01)
*B66C 15/06* (2006.01)
*B66C 17/06* (2006.01)

(52) U.S. Cl.

CPC .............. *B66C 13/48* (2013.01); *B66C 11/00* (2013.01); *B66C 13/00* (2013.01); *B66C 13/22* (2013.01); *B66C 15/065* (2013.01); *B66C 17/06* (2013.01)

(58) Field of Classification Search

CPC ....... B66C 13/48; B66C 13/22; B66C 15/065; B66C 17/06

See application file for complete search history.

(56) References Cited

U.S. PATENT DOCUMENTS 3,397,309 A * 8/1968 Stone ...................... B66C 13/30 246/182 R
3,973,683 A * 8/1976 Keller ..................... B66C 15/00 212/281

(Continued)

*Primary Examiner* — Michael R Mansen
*Assistant Examiner* — Juan J Campos, Jr.
(74) *Attorney, Agent, or Firm* — Michael Crilly, Esquire

(57) ABSTRACT

A self-maintaining crane system including a bridge, a trolley, a hoist, and sensors for use within a hostile environment, such as a wastewater treatment facility, is presented. The bridge is movable along a pair of runway rails. The trolley is movable between the runway rails. The hoist with extendable-retractable cable is movable with the trolley. Bridge sensors determine whether the bridge has engaged home and end positions. Trolley sensors determine whether the trolley has engaged home and end positions. The bridge and the trolley are movable between home and end positions. Hoist sensors determine whether the cable has engaged a hoist home position and a hoist end position. The cable is extendable away from the home position and retractable toward the end position. Sensors facilitate automated movement of bridge, trolley, and cable so as to minimize functional impairment of the crane system by the hostile environment.

22 Claims, 8 Drawing Sheets

Related U.S. Application Data continuation of application No. 17/313,068, filed on May 6, 2021, now Pat. No. 11,649,144, which is a continuation of application No. 16/679,618, filed on Nov. 11, 2019, now Pat. No. 11,034,555, which is a division of application No. 16/093,701, filed as application No. PCT/US2017/064263 on Dec. 1, 2017, now Pat. No. 10,562,742.

(56) References Cited

U.S. PATENT DOCUMENTS

| | | | | |
|---|---|---|---|---|
| 4,004,156 | A * | 1/1977 | Schuller | B66C 13/22<br>318/293 |
| 4,278,365 | A * | 7/1981 | Sandberg | E02F 3/905<br>37/317 |
| 5,133,465 | A * | 7/1992 | Kalan | B66C 17/00<br>212/315 |
| 5,548,198 | A * | 8/1996 | Backstrand | B66C 13/22<br>318/432 |
| 7,190,146 | B1 * | 3/2007 | Kureck | B66C 13/22<br>212/173 |
| 7,542,680 | B2 * | 6/2009 | Waisanen | B66C 13/12<br>398/109 |
| 10,108,164 | B2 * | 10/2018 | Stagg | G06Q 50/08 |
| 10,562,742 | B2 * | 2/2020 | Cordell | B66C 13/00 |
| 2006/0065884 | A1 * | 3/2006 | Waisanen | B66C 15/065<br>254/415 |
| 2006/0243881 | A1 * | 11/2006 | Waisanen | B66C 13/44<br>250/206 |
| 2017/0031339 | A1 * | 2/2017 | Corbeil | G05B 19/0426 |

* cited by examiner

SELF-MAINTAINING CRANE SYSTEM WITHIN A HOSTILE ENVIRONMENT

REFERENCE TO RELATED APPLICATIONS

This application is a continuation of U.S. patent application Ser. No. 18/117,530 filed Mar. 6, 2023 which is a continuation of U.S. patent application Ser. No. 17/313,068 filed May 6, 2021, now U.S. Pat. No. 11,649,144 issued May 16, 2023, which is a continuation of U.S. patent application Ser. No. 16/679,618 filed Nov. 11, 2019, now U.S. Pat. No. 11,034,555 issued Jun. 15, 2021, which is a divisional of U.S. patent application Ser. No. 16/093,701 filed Oct. 15, 2018, now U.S. Pat. No. 10,562,742 issued Feb. 18, 2020, which is a National Phase of PCT Application No. PCT/US2017/064263 filed Dec. 1, 2017, all prior applications entitled Self-Maintaining Crane System within a Hostile Environment and hereby incorporated in their entirety herein by reference thereto.

FEDERALLY SPONSORED RESEARCH AND DEVELOPMENT

None.

FIELD OF THE INVENTION

The invention generally relates to cranes and more particularly is concerned, for example, with improvements to a crane system for use within a hostile environment of a wastewater treatment facility whereby the improvements minimize detrimental effects to the crane induced by agents within the hostile environment.

BACKGROUND OF THE INVENTION

A typical wastewater treatment facility employs a variety of physical, chemical, and biological processes to remove biological and non-biological contaminants from influent so as to yield an environmentally safer effluent.

Wastewater treatment facilities are hostile and dangerous environments characterized by corrosion causing agents. Some agents, one example being chlorine, are used to treat influent before discharge as effluent. Other agents, one example being hydrogen sulfide, are generated by influent during processing. Chlorine, hydrogen sulfide gas, and even water, with or without waste, attack and degrade metals and non-metals within a waste treatment facility. Corrosion alone is responsible for billions of dollars of damage to equipment on a yearly basis within wastewater treatment facilities.

Cranes and the like are often used within wastewater treatment facilities to lift and move equipment during maintenance operations. While crane equipment typically include features which resist corrosion, prolonged exposure to wastewater, as well as the agents added thereto and released therefrom, over time will corrode wheels, beams, rails, rollers, bearings, motors, controls, electronics, and other critical components comprising crane systems.

Furthermore, the corrosion problem specific to cranes is even more acute because of the intermittent use of such equipment within a wastewater treatment facility. A typical crane system is idle for long periods of time between uses within an environment capable of impairing function thereof, either in part or whole, via corrosive means.

Accordingly, what is required are improvements to a crane system used within a hostile environment characterized by corrosive agents whereby the improvements minimize the detrimental effects of such agents to function and operability of the crane system.

SUMMARY OF THE INVENTION

An object of the invention is to provide improvements to a crane system used within a hostile environment characterized by corrosive agents whereby the improvements minimize the detrimental effects of such agents to function and operability of the crane system.

The invention is a system and a method therefore applicable to a crane or lift generally comprising a bridge, a trolley and a hoist. The bridge is movable along a pair of runway rails. The trolley is movable along a pair of rails or a monorail in a direction generally perpendicular to travel by the bridge. The hoist extends and retracts a cable in a direction generally perpendicular to travel by both bridge and trolley.

The invention automatically exercises a crane system based on a fixed or adjustable time schedule or sensor data indicative of degradation so that the bridge, trolley, and hoist are powered thereafter causing the bridge to move along the runway rails, the trolley to move along the rail(s), and the hoist to lower and raise a cable. The exercise, sometimes referred to as cycling, is automatically initiated without user input thereby providing a crane system with self-maintenance functionality.

One purpose of the invention is to avoid the problems associated with occasional use of a crane system exposed to moisture or other corrosion/rust inducing environments by automatically exercising wheels, motors, controls, bearings, electronics, and other damage prone components. It is believed that movement by and between components, function of electronics, and heat generated by motors and between moving parts within the crane system prevent, arrest, impede, and/or remove corrosion as well as dust and moisture detrimental to function of a crane.

The system generally includes a pair of bridge sensors, a pair of trolley sensors, a pair of hoist sensors, optional alarm element(s), optional control element(s), optional computer, and other optional sensor(s). Sensor(s) and alarm element(s) communicate with the control module(s). The control module(s) communicates with control elements for the crane system.

In preferred embodiments, one sensor in each pair determines whether bridge, trolley, and cable within the hoist are in a home position so that the cycle may begin. If one or more sensors identify a non-home position, then alarm element(s) is/are activated so that a user may reposition the bridge, trolley and/or hoist to the proper home position(s). If the sensors identify all components are in a home position, then a cycle is initiated so that the bridge moves, the trolley moves, and the hoist lowers/raises a cable. The alarm elements are also activated during cycling so that persons nearby avoid contact with the crane system. After a cycle is complete, bridge, trolley, and hoist return to their respective stop or end positions corresponding to a home position. One sensor in each pair confirms return to an end position so that a timer or other component is reset for the next cycle and the system is depowered.

In some embodiments, a control module or other components of the system, may communicate with a SCADA (Supervisory Control and Data Acquisition system) or Ethernet so that a computer may gather, store, and/or analyze real-time data from the crane system to document cycling and results thereof. This information may be used at least in part to determine, assess, or estimate condition and functionality of components within the crane system.

In accordance with embodiments of the invention, the self-maintaining crane system includes a wastewater treatment facility, a bridge, a trolley, a hoist, a pair of bridge sensors, a pair of trolley sensors, and a pair of hoist sensors. A hostile environment is disposed within the wastewater treatment facility. The bridge is movable along a pair of runway rails within the hostile environment. The trolley is movable along at least one rail between the runway rails. The hoist is disposed along the trolley. A cable is extendable from and retractable into the hoist. One bridge sensor determines whether the bridge is positioned at a bridge home position and another bridge sensor determines whether the bridge is positioned at a bridge end position. The bridge is movable away from the bridge home position and back toward the bridge end position after one bridge sensor determines the bridge is positioned at the bridge home position. One trolley sensor determines whether the trolley is positioned at a trolley home position and another trolley sensor determines whether the trolley is positioned at a trolley end position. The trolley is movable away from the trolley home position and back toward the trolley end position after one trolley sensor determines the trolley is positioned at the trolley home position. One hoist sensor determines whether the cable is positioned at a hoist home position and another hoist sensor determines whether the cable is positioned at a hoist end position. The cable is movable away from the hoist home position and back toward the hoist end position after one hoist sensor determines whether the cable is positioned at the hoist home position. The bridge, the trolley, or the cable are automatically moved to minimize functional impairment of the crane system by the hostile environment.

In accordance with other embodiments of the invention, the hostile environment includes at least one corrosive agent. The corrosive agent is hydrogen sulfide, chlorine, or water.

In accordance with other embodiments of the invention, the bridge is automatically movable only after one bridge sensor determines whether the bridge is at that bridge home position, one trolley sensor determines whether the trolley is at the trolley home position, and one hoist sensor determines whether the cable is at the hoist home position.

In accordance with other embodiments of the invention, the trolley is automatically movable only after one bridge sensor determines whether the bridge is at that bridge home position, one trolley sensor determines whether the trolley is at the trolley home position, and one hoist sensor determines whether the cable is at the hoist home position.

In accordance with other embodiments of the invention, the cable is automatically movable only after one bridge sensor determines whether the bridge is at that the bridge home position, one trolley sensor determines whether the trolley is at the trolley home position, and one hoist sensor determines whether the cable is at the hoist home position.

In accordance with other embodiments of the invention, the pair of bridge sensors are fixed with respect to the bridge home position and the bridge end position.

In accordance with other embodiments of the invention, the pair of bridge sensors are movable with respect to the bridge home position and the bridge end position.

In accordance with other embodiments of the invention, the pair of trolley sensors are fixed with respect to the trolley home position and the trolley end position.

In accordance with other embodiments of the invention, the pair of trolley sensors are movable with respect to the trolley home position and the trolley end position.

In accordance with other embodiments of the invention, the pair of hoist sensors are fixed with respect to the hoist home position and the hoist end position.

In accordance with other embodiments of the invention, the pair of hoist sensors are movable with respect to the hoist home position and the hoist end position.

In accordance with other embodiments of the invention, the crane system further includes a control module communicable with the bridge sensors, the trolley sensors, and the hoist sensors so that the control module directs start and stop function of the bridge, the trolley, and the hoist.

In accordance with other embodiments of the invention, the crane system further includes a computer that gathers data from at least one of the control module, the bridge sensors, the trolley sensors, and the hoist sensors.

In accordance with other embodiments of the invention, the crane system further includes at least one alarm element activatable when one bridge sensor determines the bridge is not located at the bridge home position, one trolley sensor determines the trolley is not located at the trolley home position, or one hoist sensor determines the cable is not positioned at the hoist home position.

In accordance with other embodiments of the invention, the crane system further includes at least one secondary sensor which gathers data to assess impairment to the crane system by the hostile environment.

In accordance with other embodiments of the invention, the bridge automatically twice traverses at least some length of the runway rails after moving away from the bridge home position and returning to the bridge end position, the trolley automatically twice traverses at least some length of at least one rail after moving away from the trolley home position and returning to the trolley end position, and at least some length of the cable is both extended from and retracted into the hoist.

In accordance with method embodiments of the invention, the self-maintaining crane system is automatically exercised within a hostile environment by moving a bridge away from a bridge home position and back toward a bridge end position, moving a trolley away from a trolley home position and back toward a trolley end position, moving a cable via a hoist away from a hoist home position and back toward a hoist end position, stopping the bridge when a second bridge sensor determines the bridge engages the bridge end position, stopping the trolley when a second trolley sensor determines the trolley engages the trolley end position, and stopping the hoist when a second hoist sensor determines the cable engages the hoist end position. The moving steps are implemented contingent on a parameter indicative of functional impairment to the crane system by the hostile environment. The moving steps are permitted only after a first bridge sensor determines the bridge engages the bridge home position, a first trolley sensor determines the trolley engages the trolley home position, and a first hoist sensor determines the cable engages the hoist home position.

In accordance with other embodiments of the invention, the method further includes returning the bridge before the moving step to the bridge home position when the bridge does not initially engage the first bridge sensor, returning the trolley before the moving step to the trolley home position when the trolley does not initially engage the first trolley sensor, and returning the cable before the moving step to the hoist home position when the cable does not initially engage the first hoist sensor.

In accordance with other embodiments of the invention, the method further includes activating an alarm element during at least one of the returning steps.

In accordance with other embodiments of the invention, the method further includes communicating data from at least one of the bridge sensors, the trolley sensors, and the hoist sensors to a control module and implementing the moving steps and the stopping steps via the control module based on the data.

In accordance with other embodiments of the invention, the method further includes communicating data from the control module to a computer.

In accordance with other embodiments of the invention, the parameter is time elapsed after the bridge, the trolley, and the cable were last moved.

In accordance with other embodiments of the invention, the parameter is indicative of corrosion measured by a secondary sensor.

In accordance with other embodiments of the invention, the parameter is at least one of current, voltage, or resistance.

In accordance with other embodiments of the invention, the parameter is humidity.

In accordance with other embodiments of the invention, the parameter is temperature.

In accordance with other embodiments of the invention, the parameter is concentration of a corrosive agent within the hostile environment.

In accordance with other embodiments of the invention, the hostile environment is within a wastewater treatment facility.

In accordance with other embodiments of the invention, one of the moving steps mechanically mitigates corrosion on the bridge, the trolley, or the hoist.

In accordance with other embodiments of the invention, one of the moving steps thermally mitigates at least one of corrosion or moisture on the bridge, the trolley, or the hoist.

Several advantages of the invention include, but are not limited to, the following. The invention automates maintenance of a crane within a wastewater treatment facility. The invention tailors the interval over which a crane sits idle to conditions within a hostile environment thereby reducing the cumulative degradation to a crane caused by agents within a wastewater treatment facility or other environments. The invention utilizes functionality of a crane to reduce rust and other detrimental effects that a corrosive environment may cause to the crane when not in use.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION

Figure 1:
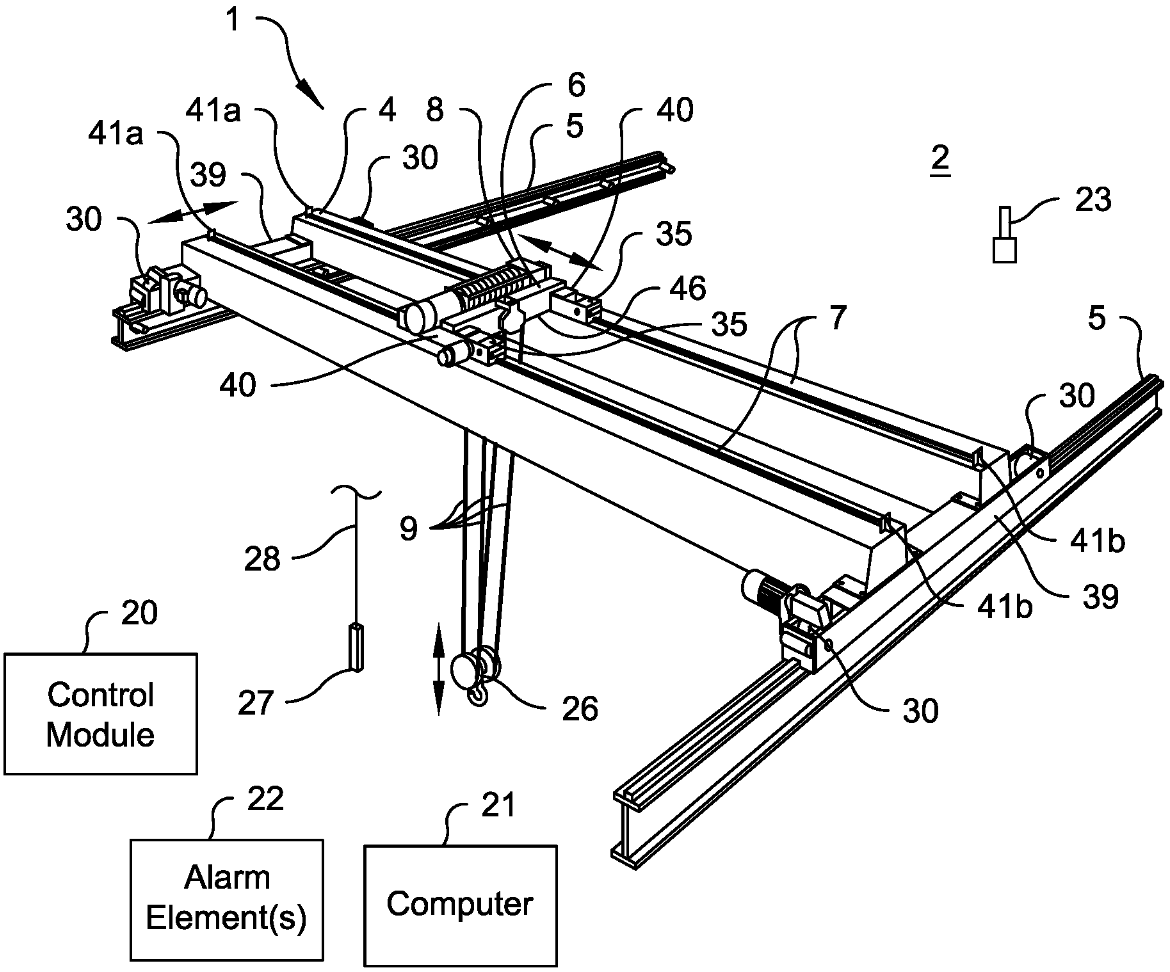
FIG. 1 is a perspective view illustrating an example crane system wherein sensor pairs are disposed along each of a bridge, a trolley, and a hoist to enable automated movement thereof so as to avoid corrosion and other detrimental effects to the crane system by a hostile environment in accordance with an embodiment of the invention.

Reference will now be made in detail to embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described herein, it is understood that such features may be combinable to form other additional embodiments.

Referring now to FIG. 1, the crane system 1 generally includes a bridge 4, a trolley 6, and a hoist 8 disposed within a hostile environment 2. The hostile environment 2 may be situated within and exposed to the atmosphere or may reside within an enclosure, one example of the latter being a building. By way of example, the hostile environment 2 may reside within a wastewater treatment facility which requires a crane system 1 to operate within surroundings detrimental to the mechanical and/or electrical operability of the crane system 1. The hostile environment 2 may be formed by solid(s), liquid(s), and/or gas(es) capable of degrading or compromising function of the crane system 1 via, by way of example only, corrosion, dust, sand, powder, chemicals, petro, or moisture whereby a coating is either formed or deposited which degrades mechanical and/or electrical performance critical to operability. The hostile environment 2 may also be specific to an application such as, by way of example only, marine or outdoor. Degradation may be caused by one or more agents residing within the hostile environment 2. Example agents include, but are not limited to, hydrogen sulfide, chlorine, and water.

Figure 2A:
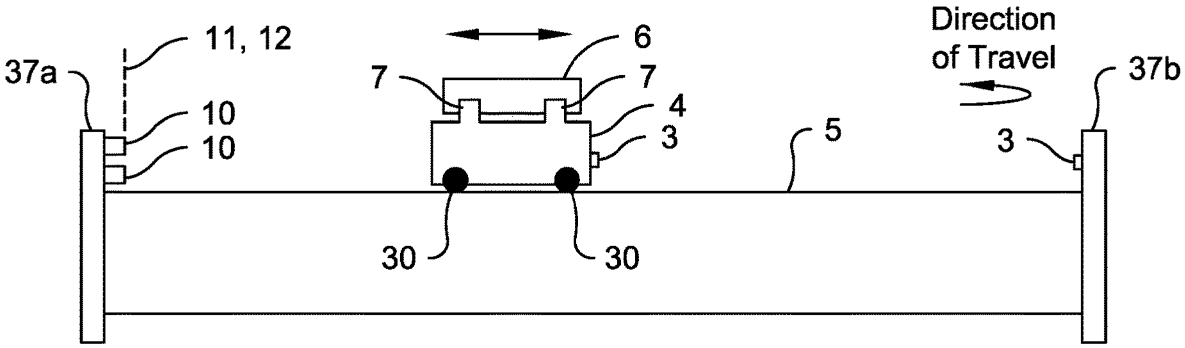
FIG. 2*a* is a schematic cross-section view illustrating a bridge with trolley and hoist thereon movable along a runway rail with a pair of bridge sensors attached to the crane adjacent to the runway rail so as to allow the bridge to engage one sensor corresponding to a home position and another sensor corresponding to an end position whereby the sensors are fixed at the home and end positions in accordance with an embodiment of the invention.
Figure 2B:
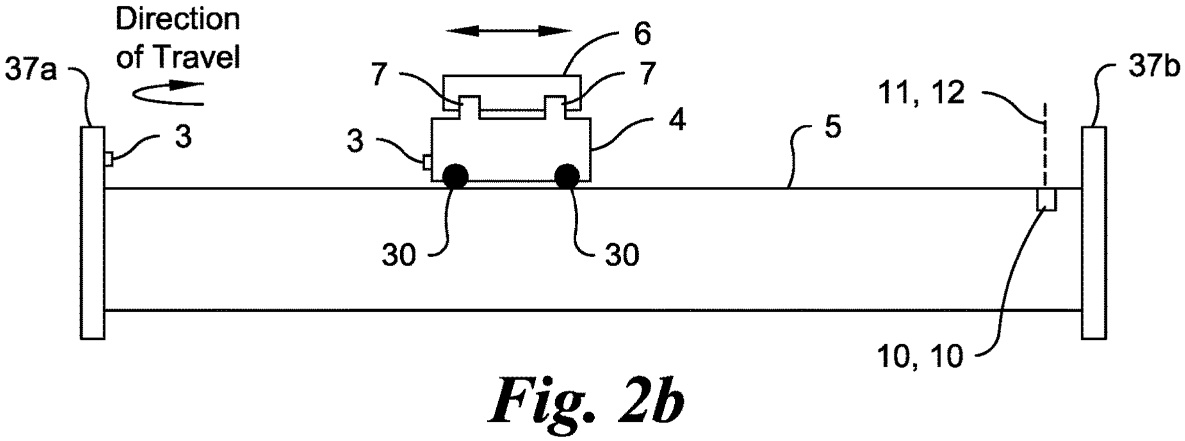
FIG. 2*b* is a schematic cross-section view illustrating a bridge with trolley and hoist thereon movable along a runway rail with a pair of bridge sensors attached to the runway rail so as to allow the bridge to engage one sensor corresponding to a home position and another sensor corresponding to an end position whereby the sensors are fixed at the home and end positions in accordance with an embodiment of the invention.
Figure 2C:
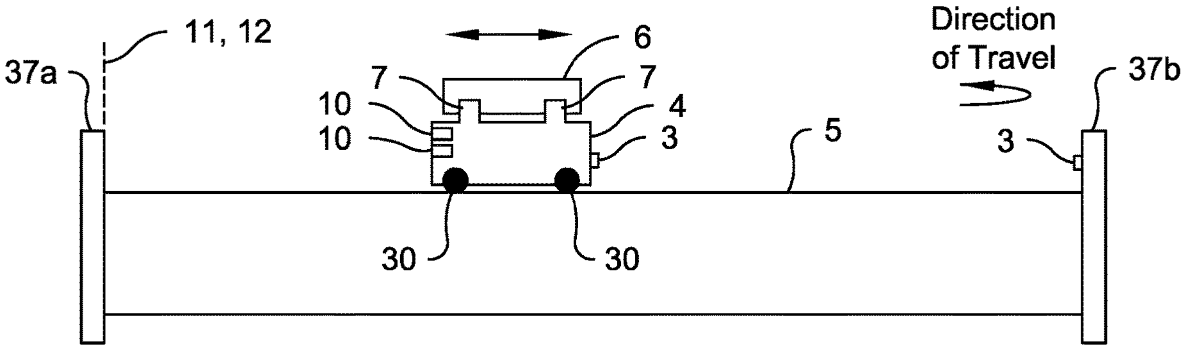
FIG. 2*c* is a schematic cross-section view illustrating a bridge with trolley and hoist thereon movable along a runway rail with a pair of bridge sensors attached to the bridge so as to allow the bridge to engage one sensor corresponding to a home position and another sensor corresponding to an end position whereby the sensors are movable with respect to the home and end positions in accordance with an embodiment of the invention.

Referring again to FIG. 1, the bridge 4 is movable along a pair of runway rails 5, the latter being spaced and parallel. The bridge 4 may include a pair of end trucks 39 separately fixed at opposite ends of at least one rail 7. Each end truck 39 may further include a pair of bridge wheels 30 which engage a runway rail 5 thereby allowing the end truck 39 to move along the runway rail 5. Each end truck 39 is shaped to engage a runway rail 5 so that the bridge 4 is movable along a preferred direction aligned with the length of the runway rail 5. A mechanical stop 37*a*, 37*b* or the like may be separately attached at each end of each runway rail 5 so as to restrict movement by the bridge 4 to the runway rails 5, as illustrated in FIGS. 2*a*-2*c*.

In some applications, a pair of rails 7 may be required to support the trolley 6 with hoist 8. In other applications, a single rail 7 or monorail arrangement may be sufficient so that the trolley 6 and hoist 8 are movable with respect to the bridge 4. While specific reference is made to rails 7 throughout the description, it is understood that the invention may also include embodiments with one only rail 7.

Referring again to FIG. 1, the trolley 6 is movable along the rail(s) 7, the latter being separately spaced and parallel. The trolley 6 may include at least one trolley frame 40. In some embodiments, a pair of trolley frames 40 are separately fixed at opposite ends of a cross member 46. A hoist 8 is attached to the cross member 46 and/or at least one trolley frame 40. Each trolley frame 40 may further include a pair of trolley wheels 35 which engage a rail 7 thereby allowing the trolley frame 40 to move along the rail 7. Each trolley frame 40 is shaped to engage a rail 7 so that the trolley 6 is movable along a preferred direction aligned with the length of the rails 7. This arrangement requires the trolley 6 to be movable generally perpendicular to both the runway rails 5 and the movable direction of the bridge 4. A mechanical stop 41*a*, 41*b* or the like may be separately attached at each end of each rail 7 so as to restrict movement by the trolley 6 to the span of the rails 7. In other embodiments, the trolley 6 may ride along a lower flange of a single rail 7.

Referring again to FIG. 1, the hoist 8 includes means understood in the art, such as a motor driven shaft or spool, that facilitate extension and retraction of a cable 9 in a direction generally perpendicular to preferred directions of travel by both the bridge 4 and the trolley 6. The cable 9 is understood to include, by way of example, cables, chains, straps, and the like capable of supporting an item when raised and lowered. A block 26 is secured to the cable 9 so as to move away from the crane system 1 when the cable 9 is extended and to move toward the crane system 1 when the cable 9 is retracted. The block 26 may include a hook or the like facilitating lift functionality of the crane system 1.

Referring again to FIG. 1, the crane system 1 may further include a controller 27 tethered thereto via a cable 28. The controller 27 facilitates manual control of the crane system 1 as required for maintenance operations within the hostile environment 2 or to reposition bridge 4, trolley 6, or cable 9 before an automatic cycling of the crane system 1. The controller 27 may also facilitate selection of automated features of the invention.

While specific reference is made in FIG. 1 to a top running bridge 4 with a top running trolley 6, it is understood that the invention is also applicable to other crane designs known within the art including, but not limited to, cranes wherein a bridge 4 and/or a trolley 6 are underhung. Other non-limiting examples include jibs, gantries, davits, winches, and monorails. Therefore, the crane system 1 in FIG. 1 is for illustrative purposes only and does not limit the claimed invention to any one particular design or type of crane system 1.

Referring now to FIGS. 2*a*-2*c*, three non-limiting example embodiments of the invention are illustrated for the bridge 4. The bridge 4 is movable along each runway rail 5 via the bridge wheels 30. The trolley 6 contacts the rails 7 at the top end of the bridge 4 and moves with the bridge 4. Travel by the bridge 4 along the runway rails 5 may be limited by the crane structure or other features, one example of the latter being mechanical stops 37*a*, 37*b*. The mechanical stops 37*a*, 37*b* can be elements directly attached or fixed to the crane system 1, such as to the runway rail 5 as illustrated in FIGS. 2*a*-2*c*, or secured adjacent to the crane system 1 so as to properly engage the bridge 4 thereby preventing the bridge 4 from rolling off the end of the runway rails 5.

Referring now to FIG. 2*a*, a pair of bridge sensors 10 are secured to the crane structure. The crane structure could be the mechanical stop 37*a* at one end of one runway rail 5, however attachment to another part of the crane system 1 is possible. The bridge sensors 10 are separately secured to the mechanical stop 37*a* via mechanical fasteners or other suitable means. One bridge sensor 10 is configured to determine whether the bridge 4 engages a start position otherwise referred to as the bridge home position 11. Another bridge sensor 10 is configured to determine whether the bridge 4 engages a stop position otherwise referred to as the bridge end position 12. The bridge sensors 10 are positioned so that the bridge home position 11 and the bridge end position 12 are co-located enabling the bridge 4 to simultaneously engage both bridge sensors 10. The fixed arrangement between bridge sensors 10 and mechanical stop 37*a* also fixes the bridge sensors 10 with respect to the bridge home position 11 and the bridge end position 12.

Referring again to FIG. 2*a*, the arrangement of mechanical stops 37*a*, 37*b* and bridge sensors 10 with respect to the runway rail 5 enables the bridge 4 to move between the mechanical stops 37*a*, 37*b* so that at least some portion of each runway rail 5 is twice traversed by the bridge 4. The bridge 4 is movable away the bridge sensor 10 corresponding to the bridge home position 11 and toward the second mechanical stop 37*b* after the start bridge sensor 10 determines the bridge 4 is positioned at the bridge home position 11. The bridge 4 then traverses the runway rail 5 until it reaches the second mechanical stop 37*b* with or without contact therebetween. Thereafter, the bridge 4 is redirected to move away from the second mechanical stop 37*b* and toward the first mechanical stop 37*a*. The bridge 4 stops moving when the stop bridge sensor 10 determines the bridge 4 engages the bridge end position 12.

Referring now to FIG. 2*b*, a pair of bridge sensors 10 are secured to the crane structure, another non-limiting example being the runway rail 5 adjacent to the second mechanical stop 37*b*. However, it is understood that bridge sensors 10 could be secured at other locations along the runway rail 5. The bridge sensors 10 are separately secured to the runway rail 5 via mechanical fasteners or other suitable means. One bridge sensor 10 is configured to determine whether the bridge 4 engages a start position otherwise referred to as the bridge home position 11. Another bridge sensor 10 is configured to determine whether the bridge 4 engages a stop position otherwise referred to as the bridge end position 12. The bridge sensors 10 are positioned so that the bridge home position 11 and the bridge end position 12 are co-located enabling the bridge 4 to simultaneously engage both bridge sensors 10. The fixed arrangement between bridge sensors 10 and runway rail 5 also fixes the bridge sensors 10 with respect to the bridge home position 11 and the bridge end position 12.

Referring again to FIG. 2*b*, the arrangement of bridge sensors 10 with respect to the runway rail 5 enables the bridge 4 to move between the mechanical stops 37*a*, 37*b* so that at least some portion of each runway rail 5 is twice traversed by the bridge 4. The bridge 4 is movable away the bridge sensor 10 corresponding to the bridge home position 11 and toward the first mechanical stop 37*a* after the start bridge sensor 10 determines the bridge 4 is positioned at the bridge home position 11. The bridge 4 then traverses the runway rail 5 until it reaches the first mechanical stop 37*a* with or without contact therebetween. Thereafter, the bridge 4 is redirected to move away from the first mechanical stop 37*a* and toward the second mechanical stop 37*b*. The bridge 4 stops moving when the stop bridge sensor 10 determines the bridge 4 engages the bridge end position 12.

Referring now to FIG. 2*c*, a pair of bridge sensors 10 are secured to the bridge 4, one non-limiting example being a side of the bridge 4 in the direction of the first mechanical stop 37*a* although other locations are possible. The bridge sensors 10 are separately secured to the bridge 4 via mechanical fasteners or other suitable means. One bridge sensor 10 is configured to determine whether the bridge 4 engages a start position otherwise referred to as the bridge home position 11. Another bridge sensor 10 is configured to determine whether the bridge 4 engages a stop position otherwise referred to as the bridge end position 12. In this embodiment, the bridge home position 11 and the bridge end position 12 are co-located at the first mechanical stop 37*a* whereas both bridge sensors 10 are co-located on the bridge 4. The bifurcation of the physical location of the bridge sensors 10 from the physical location of the bridge home and end positions 11, 12 permits the bridge sensors 10 to move with respect to the start and stop positions.

Referring again to FIG. 2*c*, the arrangement of mechanical stops 37*a*, 37*b* and the movable bridge sensors 10 enables the bridge 4 to move between the mechanical stops 37*a*, 37*b* so that at least some portion of each runway rail 5 is twice traversed by the bridge 4. The bridge 4 is movable away the bridge home position 11 and toward the second mechanical stop 37*b* when the start bridge sensor 10 determines the bridge 4 engages the bridge home position 11. The bridge 4 then traverses the runway rail 5 until it reaches the second mechanical stop 37*b* with or without contact therebetween. Thereafter, the bridge 4 is redirected to move away from the second mechanical stop 37*b* and toward the first mechanical stop 37*a*. The bridge 4 stops moving when the stop bridge sensor 10 determines the bridge 4 engages the bridge end position 12.

The bridge sensors 10 may include one or more sensor types capable of detecting the position of the bridge 4 with respect to the bridge home position 11 and the bridge end position 12. In some embodiments, one or more bridge sensors 10 can be a proximity-type device with detection means including, but not limited to, capacitive, Doppler, eddy-current, inductive, magnetic, radar, sonar, or ultrasonic. In other embodiments, one or more bridge sensors 10 can be an optical-type device with detection means including, but not limited to, heat, visible light, or invisible light. In yet other embodiments, one or more bridge sensors 10 can be a contact-type device with detection means including, but not limited to, force, pressure, vibration, or acceleration.

Redirection of or reversal to the direction of travel by the bridge 4 adjacent to a non-stop interface, examples of the latter being the mechanical stop 37*b* in FIGS. 2*a* and 2*c* and the mechanical stop 37*a* in FIG. 2*b*, may be implemented without or with sensor(s) 3. For example, the bridge 4 may be permitted to move along the runway rails 5 in a first direction for a predetermined time period implemented via a timer circuit based on a velocity for the bridge 4 and then permitted to move along the same runway rails 5 in a second direction for another predetermined time period based on a velocity for the bridge 4 in the opposite direction. The velocities and time periods may be the same or different for the opposed directions of travel. In another example, a sensor 3 may be attached to either the bridge 4 or an element of the crane, examples of the latter being the mechanical stop 37*a*, 37*b* or the runway rail 5, to determine arrival via contact or non-contact means at a non-stop interface after which the direction of travel is reversed. In yet another example, a pair of sensors 3 separately attached to the bridge 4 and a non-stop interface may determine arrival via contact or non-contact means at the non-stop interface after which the direction of travel is reversed. In the latter embodiments, one sensor 3 may communicate with the other sensor 3 to implement redirection or reversal to the direction of travel when appropriate. Sensor(s) 3 may include one or more of the device types suitable for the bridge sensors 10 or other suitable device(s). In alternate embodiments, a second pair of bridge sensors 10 could be mechanically fastened to another mechanical stop 37*a*, 37*b* or another side of the bridge 4 so that the bridge 4 is disposed between the dual pairs of bridge sensors 10 thereby allowing one set of bridge sensors 10 to control travel in a first direction and another set of bridge sensors 10 to control travel in a second direction. Each set of bridge sensors 10 may include two sensors 10 on the same side or opposite sides.

In preferred embodiments, the bridge 4 is automatically movable only after one bridge sensor 10 determines the bridge 4 is at the bridge home position 11, one trolley sensor 13 determines the trolley 6 is at the trolley home position 14, and one hoist sensor 16 determines the cable 9 is at the hoist home position 17.

Figure 3A:
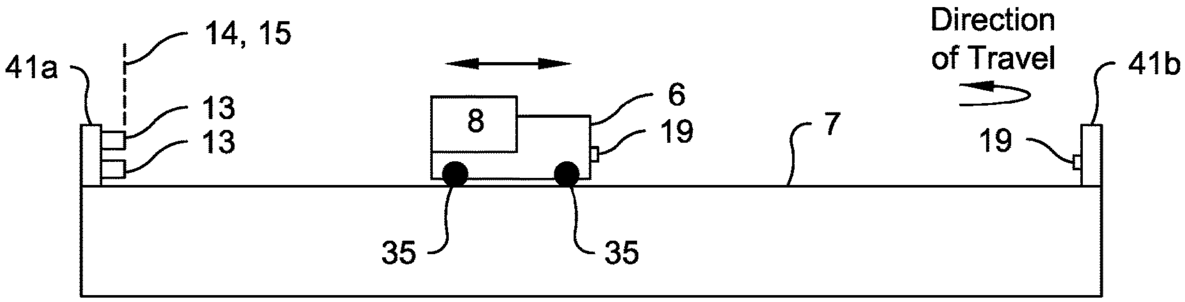
FIG. 3*a* is a schematic cross-section view illustrating a trolley with hoist thereon movable along a rail with a pair of trolley sensors attached to the crane adjacent to the rail so as to allow the trolley to engage one sensor corresponding to a home position and another sensor corresponding to an end position whereby the sensors are fixed at the home and end positions in accordance with an embodiment of the invention.
Figure 3B:
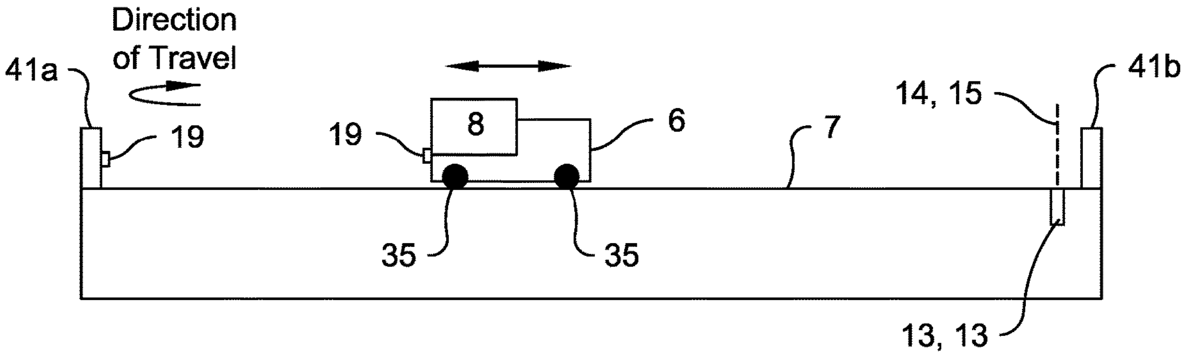
FIG. 3*b* is a schematic cross-section view illustrating a trolley with hoist thereon movable along a rail with a pair of trolley sensors attached to the rail so as to allow the trolley to engage one sensor corresponding to a home position and another sensor corresponding to an end position whereby the sensors are fixed at the home and end positions in accordance with an embodiment of the invention.
Figure 3C:
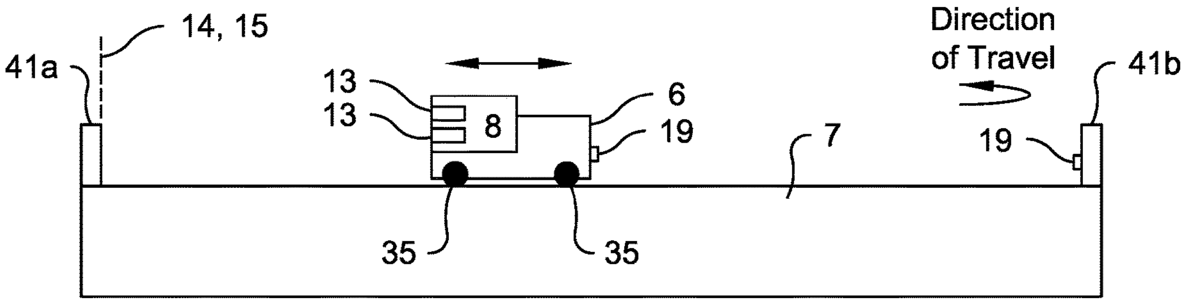
FIG. 3*c* is a schematic cross-section view illustrating a trolley with hoist thereon movable along a rail with a pair of trolley sensors attached to the trolley so as to allow the trolley to engage one sensor corresponding to a home position and another sensor corresponding to an end position whereby the sensors are movable with respect to the home and end positions in accordance with an embodiment of the invention.

Referring now to FIGS. 3*a*-3*c*, three non-limiting example embodiments are illustrated for the trolley 6. The trolley 6 is movable along each rail 7 via the trolley wheels 35. The hoist 8 contacts the trolley 6 and moves with the trolley 6. Travel by the trolley 6 along the rail(s) 7 may be limited by the crane structure or other features, one example of the latter being mechanical stops 41*a*, 41*b*. The mechanical stops 41*a*, 41*b* can be elements directly attached or fixed to the crane system 1, such as to the rails 7 as illustrated in FIGS. 3*a*-3*c*, or secured adjacent to the crane system 1 so as to properly engage the trolley 6 thereby preventing the trolley 6 from rolling off the end of the rails 7.

Referring now to FIG. 3*a*, a pair of trolley sensors 13 are secured to the crane structure for example to the mechanical stop 41*a* at one end of one rail 7, however attachment to another part of the crane system 1 is possible. The trolley sensors 13 are separately secured to the mechanical stop 41*a* via mechanical fasteners or other suitable means. One trolley sensor 13 is configured to determine whether the trolley 6 engages a start position otherwise referred to as the trolley home position 14. Another trolley sensor 13 is configured to determine whether the trolley 6 engages a stop position otherwise referred to as the trolley end position 15. The trolley sensors 13 are positioned so that the trolley home position 14 and the trolley end position 15 are co-located enabling the trolley 6 to simultaneously engage both trolley sensors 13. The fixed arrangement between trolley sensors 13 and mechanical stop 41*a* also fixes the trolley sensors 13 with respect to the trolley home position 14 and the trolley end position 15.

Referring again to FIG. 3*a*, the arrangement of mechanical stops 41*a*, 41*b* and trolley sensors 13 with respect to the rail 7 enables the trolley 6 to move between the mechanical stops 41*a*, 41*b* so that at least some portion of each rail 7 is twice traversed by the trolley 6. The trolley 6 is movable away the trolley sensor 13 corresponding to the trolley home position 14 and toward the second mechanical stop 41*b* after the start trolley sensor 13 determines the trolley 6 engages the trolley home position 14. The trolley 6 then traverses the rail 7 until it reaches the second mechanical stop 41*b* with or without contact therebetween. Thereafter, the trolley 6 is redirected to move away from the second mechanical stop 41*b* and toward the first mechanical stop 41*a*. The trolley 6 stops moving when the stop trolley sensor 13 determines the trolley 6 engages the trolley end position 15.

Referring now to FIG. 3*b*, a pair of trolley sensors 13 are secured to the crane structure, another non-limiting example being a rail 7 adjacent to the second mechanical stop 41*b*. It is understood that trolley sensors 13 could be secured at other locations along the rail 7. The trolley sensors 13 are separately secured to the rail 7 via mechanical fasteners or other suitable means. One trolley sensor 13 is configured to determine whether the trolley 6 engages a start position otherwise referred to as the trolley home position 14. Another trolley sensor 13 is configured to determine whether the trolley 6 engages a stop position otherwise referred to as the trolley end position 15. The trolley sensors 13 are positioned so that the trolley home position 14 and the trolley end position 15 are co-located enabling the trolley 6 to simultaneously engage both trolley sensors 13. The fixed arrangement between trolley sensors 13 and rail 7 also fixes the trolley sensors 13 with respect to the trolley home position 14 and the trolley end position 15.

Referring again to FIG. 3*b*, the arrangement of trolley sensors 13 with respect to the rail 7 enables the trolley 6 to move between the mechanical stops 41*a*, 41*b* so that at least some portion of each rail 7 is twice traversed by the trolley 6. The trolley 6 is movable away the trolley sensor 13 corresponding to the trolley home position 14 and toward the first mechanical stop 41*a* when the start trolley sensor 13 determines the trolley 6 is positioned at the trolley home position 14. The trolley 6 then traverses the rail 7 until it reaches the first mechanical stop 41*a* with or without contact therebetween. Thereafter, the trolley 6 is redirected to move away from the first mechanical stop 41*a* and toward the second mechanical stop 41*b*. The trolley 6 stops moving when the stop trolley sensor 13 determines the trolley 6 is positioned at the trolley end position 15.

Referring now to FIG. 3*c*, a pair of trolley sensors 13 are secured to the trolley 6 for example to a side in the direction of the first mechanical stop 41*a*, although other locations are possible. The trolley sensors 13 are separately secured to the trolley 6 via mechanical fasteners or other suitable means. One trolley sensor 13 is configured to determine whether the trolley 6 engages a start position otherwise referred to as the trolley home position 14. Another trolley sensor 13 is configured to determine whether the trolley 6 engages a stop position otherwise referred to as the trolley end position 14. In this embodiment, the trolley home position 14 and the trolley end position 15 are co-located at the first mechanical stop 41*a* whereas both trolley sensors 13 are co-located on the trolley 6. The bifurcation of the physical location of the trolley sensors 13 from the physical location of the trolley home and end positions 14, 15 permits the trolley sensors 13 to move with respect to the start and stop positions.

Referring again to FIG. 3*c*, the arrangement of mechanical stops 41*a*, 14*b* and the movable trolley sensors 13 enables the trolley 6 to move between the mechanical stops 41*a*, 41*b* so that at least some portion of each rail 7 is twice traversed by the trolley 6. The trolley 6 is movable away the trolley home position 14 and toward the second mechanical stop 41*b* when the start trolley sensor 13 determines the trolley 6 engages the trolley home position 14. The trolley 6 then traverses the rail 7 until it reaches the second mechanical stop 41*b* with or without contact therebetween. Thereafter, the trolley 6 is redirected to move away from the second mechanical stop 41*b* and toward the first mechanical stop 41*a*. The trolley 6 stops moving when the stop trolley sensor 13 determines the trolley 6 engages the trolley end position 15.

The trolley sensors 13 may include one or more sensor types capable of detecting the position of the trolley 6 with respect to the trolley home position 14 and the trolley end position 15. In some embodiments, one or more trolley sensors 13 can be a proximity-type device with detection means including, but not limited to, capacitive, Doppler, eddy-current, inductive, magnetic, radar, sonar, or ultrasonic. In other embodiments, one or more trolley sensors 13 can be an optical-type device with detection means including, but not limited to, heat, visible light, or invisible light. In yet other embodiments, one or more trolley sensors 13 can be a contact-type device with detection means including, but not limited to, force, pressure, vibration, or acceleration.

Redirection of or reversal to the direction of travel by the trolley 6 adjacent to a non-stop interface, examples of the latter being the mechanical stop 41*b* in FIGS. 3*a* and 3*c* and the mechanical stop 41*a* in FIG. 3*b*, may be implemented without or with sensor(s) 19. For example, the trolley 6 may be permitted to move along the rails 7 in a first direction for a predetermined time period implemented via a timer circuit based on a velocity for the trolley 6 and then permitted to move along the same rails 7 in a second direction for another predetermined time period based on a velocity for the trolley 6 in the opposite direction. The velocities and time periods may be the same or different for the opposed directions of travel. In another example, a sensor 19 may be attached to either the trolley 6 or an element of the crane, examples of the latter being the mechanical stop 41*a*, 41*b* or the rail 7, to determine arrival via contact or non-contact means at a non-stop interface after which the direction of travel is reversed. In yet another example, a pair of sensors 19 separately attached to the trolley 6 and a non-stop interface may determine arrival via contact or non-contact means at the non-stop interface after which the direction of travel is reversed. In the latter embodiments, one sensor 19 may communicate with the other sensor 19 to implement redirection or reversal to the direction of travel when appropriate. Sensor(s) 19 may include one or more of the device types suitable for the trolley sensors 13 or other suitable device(s). In alternate embodiments, a second pair of trolley sensors 13 could be mechanically fastened to another mechanical stop 41*a*, 41*b* or another side of the trolley 6 so that the trolley 6 is disposed between the dual pairs of trolley sensors 13 thereby allowing one set of trolley sensors 13 to control travel in a first direction and another set of trolley sensors 13 to control travel in a second direction. Each set of trolley sensors 13 may include two sensors 13 on the same side or opposite sides.

In preferred embodiments, the trolley 6 is automatically movable only after one bridge sensor 10 determines the bridge 4 is at the bridge home position 11, one trolley sensor 13 determines the trolley 6 is at the trolley home position 14, and one hoist sensor 16 determines the cable 9 is at the hoist home position 17.

Figure 4A:
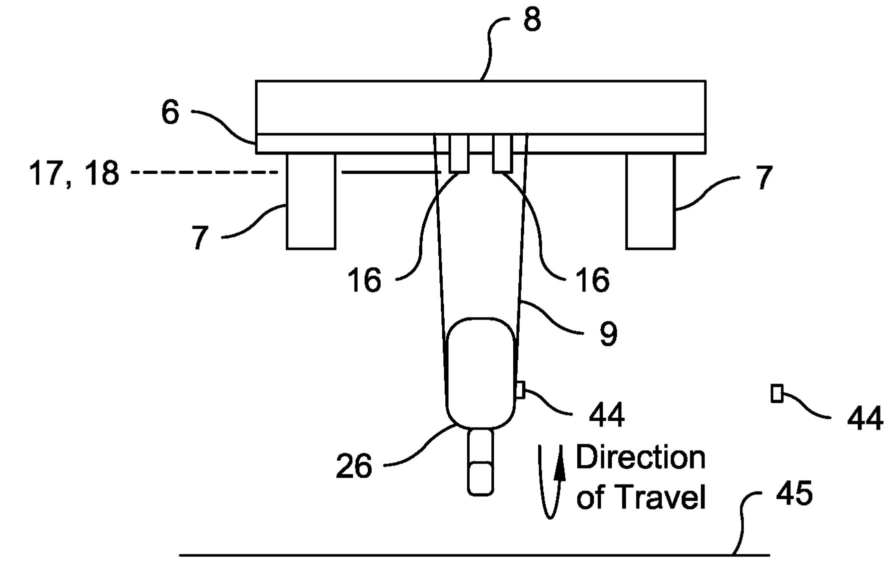
FIG. 4*a* is a schematic cross-section view illustrating a hoist including extendable/retractable cable movable with a trolley with a pair of hoist sensors attached to the hoist so as to allow a cable to engage one sensor corresponding to a home position and another sensor corresponding to an end position whereby the sensors are fixed at the home and end positions in accordance with an embodiment of the invention.
Figure 4B:
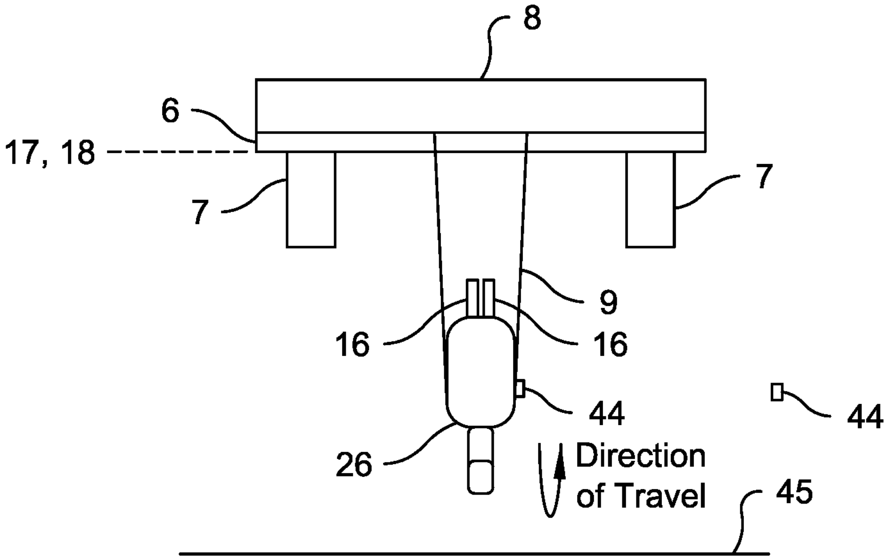
FIG. 4*b* is a schematic cross-section view illustrating a hoist including extendable/retractable cable movable with a trolley with a pair of hoist sensors attached to the hoist so as to allow the cable to engage one sensor corresponding to a home position and another sensor corresponding to an end position whereby the sensors are movable with respect to the home and end positions in accordance with an embodiment of the invention.

Referring now to FIGS. 4*a* and 4*b*, two non-limiting example embodiments are illustrated for the hoist 8 with movable cable 9. The cable 9 may include a block 26. While specific reference is made throughout to engagement or general detection of the cable 9 by hoist sensors 16, it is understood that the hoist sensors 16 could be configured to detect a specific portion of the cable 9 and/or the block 26. The cable 9 is movable via the hoist 8 so as to extend the cable 9 toward ground level 45 and retract the cable 9 away from ground level 45. In preferred embodiments, the cable 9 is disposed between and movable with respect to the rails 7.

Referring now to FIG. 4*a*, a pair of hoist sensors 16 are separately secured to the crane structure via mechanical fasteners or other suitable means. The crane structure could be the trolley 6, the hoist 8, or other suitable element on or adjacent to the crane structure. One hoist sensor 16 is configured to determine whether the cable 9 engages a start position otherwise referred to as the hoist home position 17. Another hoist sensor 16 is configured to determine whether the cable 9 engages a stop position otherwise referred to as the hoist end position 18. The hoist sensors 16 are positioned so that the hoist home position 17 and the hoist end position 18 are co-located enabling the cable 9 to simultaneously engage both hoist sensors 16. The hoist home position 17 and the hoist end position 18 may correspond to the cable 9 in a generally retracted position with the block 26 adjacent to or contacting the hoist sensors 16. The fixed arrangement between hoist sensors 16 and crane structure also fixes the hoist sensors 16 with respect to the hoist home position 17 and the hoist end position 18.

Referring again to FIG. 4*a*, the vertical arrangement of the cable 9 between the hoist 8 and the ground level 45 allows the cable 9 to be extended and retracted so that at least the same portion of the cable 9 is ejected and returned to the hoist 8. The cable 9 is extendable away the hoist sensor 16 corresponding to the hoist home position 17 and toward the ground level 45 when the start hoist sensor 16 determines the cable 9 engages the hoist home position 17. The cable 9 then traverses at least a portion of the distance between the hoist 8 and the ground level 45. Thereafter, the cable 9 is retracted to move away from the ground level 45 and toward the hoist 8. The cable 9 stops moving when the stop hoist sensor 16 determines the cable 9 engages the hoist end position 18.

Referring now to FIG. 4*b*, a pair of hoist sensors 16 are secured to the block 26 for example at a top side of the block 26, although other locations are possible. The hoist sensors 16 are separately secured to the block 26 via mechanical fasteners or other suitable means. One hoist sensor 16 is configured to determine whether the cable 9 engages a start position otherwise referred to as the hoist home position 17. Another hoist sensor 16 is configured to determine whether the cable 9 engages a stop position otherwise referred to as the hoist end position 18. In this embodiment, the hoist home position 17 and the hoist end position 18 are co-located adjacent to the hoist 8 whereas both hoist sensors 16 are co-located on the block 26. The bifurcation of the physical location of the hoist sensors 16 from the physical location of the hoist home and end positions 17, 18 permits the hoist sensors 16 to move with respect to the start and stop positions.

Referring again to FIG. 4*b*, the vertical arrangement of the cable 9 between the hoist 8 and the ground level 45 allows the cable 9 to be extended and retracted so that at least the same portion of the cable 9 is both ejected and returned to the hoist 8. The cable 9 is extendable away the hoist home position 17 and toward the ground level 45 when the start hoist sensor 16 determines the cable 9 engages the hoist home position 17. The cable 9 then traverses at least a portion of the distance between the hoist 8 and the ground level 45. Thereafter, the cable 9 is retracted to move away from the ground level 45 and toward the hoist 8. The cable 9 stops moving when the stop hoist sensor 16 determines the cable 9 engages the hoist end position 18.

The hoist sensors 16 may include one or more sensor types capable of detecting the position of the cable 9 with respect to the hoist home position 17 and the hoist end position 18. In some embodiments, one or more hoist sensors 16 can be a proximity-type device with detection means including, but not limited to, capacitive, Doppler, eddy-current, inductive, magnetic, radar, sonar, or ultrasonic. In other embodiments, one or more hoist sensors 16 can be an optical-type device with detection means including, but not limited to, heat, visible light, or invisible light. In yet other embodiments, one or more hoist sensors 16 can be a contact-type device with detection means including, but is not limited to, force, pressure, vibration, or acceleration.

Redirection of or reversal to the direction of travel by the cable 9 adjacent to a non-stop interface, examples of the latter being at or a predefined position above ground level 45, may be implemented without or with sensor(s) 44. For example, the cable 9 may be extended or uncoiled from the hoist 8 over a predetermined time period implemented via a timer circuit based on a velocity for the cable 9 and then permitted to retract or recoil into the hoist 8 for another predetermined time period based on a velocity for the cable 9 in the opposite direction. The velocities and time periods may be the same or different for the opposed directions of travel. In another example, a sensor 44 may be attached to either the block 26 or an element of or adjacent to the crane, one example of the latter being the ground level 45, to determine arrival via contact or non-contact means at a non-stop interface after which the direction of travel is reversed. In yet another example, a pair of sensors 44 separately attached to the block 26 and a non-stop interface may determine arrival via contact or non-contact means at the non-stop interface after which the direction of travel is reversed. In the latter embodiments, one sensor 44 may communicate with the other sensor 44 to implement redirection or reversal to the direction of travel when appropriate. Sensor(s) 44 may include one or more of the device types suitable for the hoist sensors 16 or other suitable device(s).

In preferred embodiments, the cable 9 is automatically movable only after one bridge sensor 10 determines the bridge 4 is at the bridge home position 11, one trolley sensor 13 determines the trolley 6 is at the trolley home position 14, and one hoist sensor 16 determines the cable 9 is at the hoist home position 17.

The sensors 10, 13, 16 in FIGS. 2*a*-2*c*, 3*a*-3*c*, and 4*a*-4*b* are configured to identify arrival at the respective home positions 11, 14, and 17 and the respective end positions 12, 15, and 18 so as to determine location-based information for starting and stopping movement of bridge 4, trolley 6, and cable 9. The sensors 10, 13, 16 may engage or otherwise detect arrival at the home positions 11, 14, 17 and the end positions 12, 15, 18 with or without contact between the respective sensors 10, 13, 16 and the locations at which or structures on which the home positions 11, 14, 17 and the end positions 12, 15, 18 reside. As such, the sensors 10, 13, 16 may identify home or end positions when a sensor 10, 13, 16 is physically at (in some embodiments) or adjacent to (in other embodiments) a home position 11, 14, 17 or an end position 12, 15, 18. The means employed for contact or non-contact sensing are due at least in part to the sensor type(s), control parameters, and functional requirements of the automated cycling or exercise of the crane system 1.

Figure 5A:
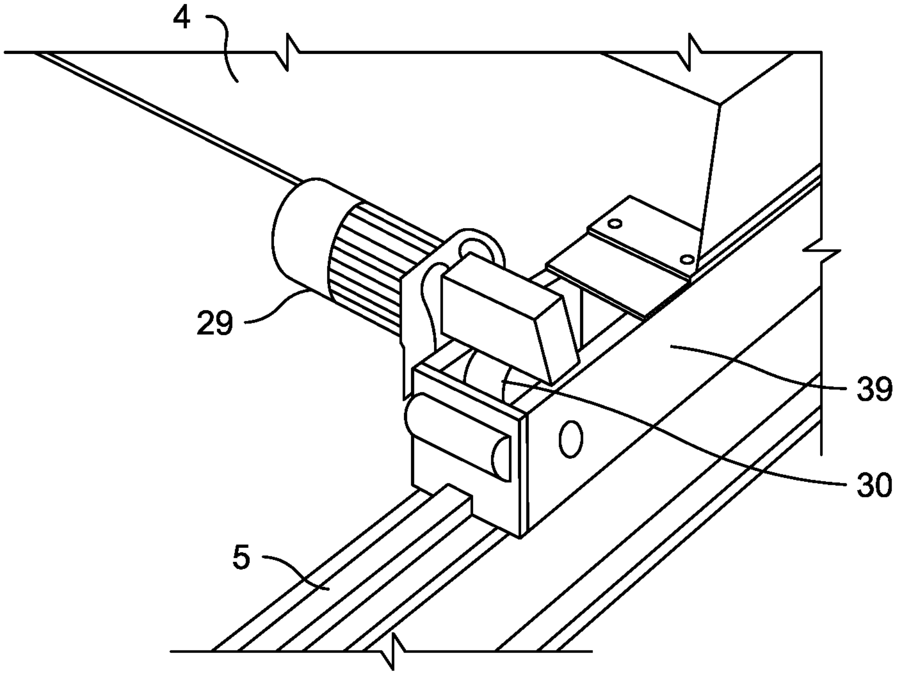
FIG. 5*a* is an enlarged perspective view illustrating arrangement between a motor driven bridge wheel and a runway rail in accordance with an embodiment of the invention.

Referring now to FIG. 5*a*, at least one bridge wheel 30 is mechanically coupled to a bridge drive motor 29. The bridge drive motor 29 and/or bridge wheel 30 are further mechanically coupled to the end truck 39. The bridge drive motor 29 rotates the bridge wheel 30 either forward or backward causing the bridge 4 to move along the runway rails 5.

Figure 5B:
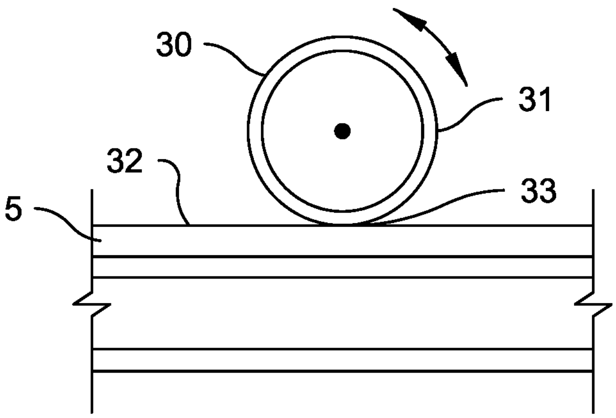
FIG. 5*b* is an enlarged schematic view illustrating contact between the motor driven bridge wheel and the runway rail of FIG. 5*a*.

Referring now to FIG. 5*b*, the roller surface 31 of the bridge wheel 30 contacts the bearing surface 32 along the runway rail 5 at the interface 33. The interface 33 and area adjacent thereto are often subject to corrosion and other detrimental effects that may cause the bridge wheel 30 to be fixed to the runway rail 5 thereafter frustrating proper rolling motion by the bridge wheel 30 along the runway rail 5. The automated cycling or exercising by the invention avoids this problem via motion between the bridge wheel 30 and the runway rail 5. The frequency and extent of motion by automatic means should be sufficient to avoid an accumulation of corrosion that would otherwise fix the bridge wheels 30 to the runway rails 5.

Figure 6A:
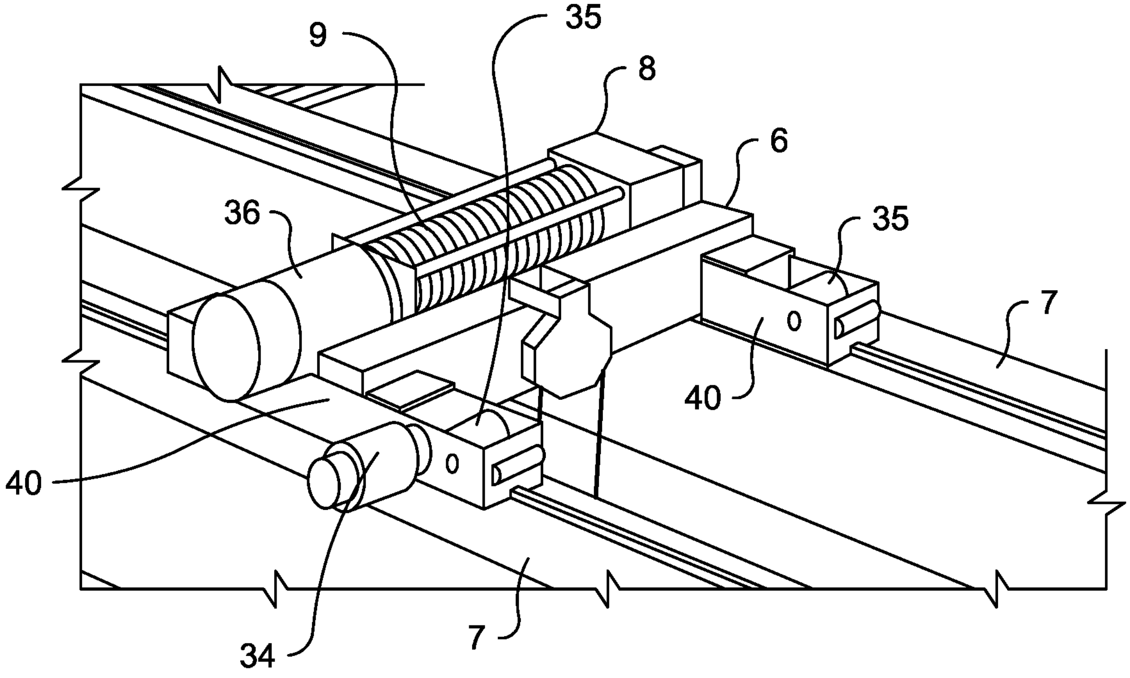
FIG. 6*a* is an enlarged perspective view illustrating engagement between a motor driven trolley wheel and a rail in accordance with an embodiment of the invention.

Referring now to FIG. 6*a*, at least one trolley wheel 35 is mechanically coupled to a trolley drive motor 34. The trolley drive motor 34 and/or trolley wheel 35 are further mechanically coupled to the trolley frame 40. The trolley drive motor 34 rotates the trolley wheel 35 either forward or backward causing the trolley 6 to move along the rails 7.

Figure 6B:
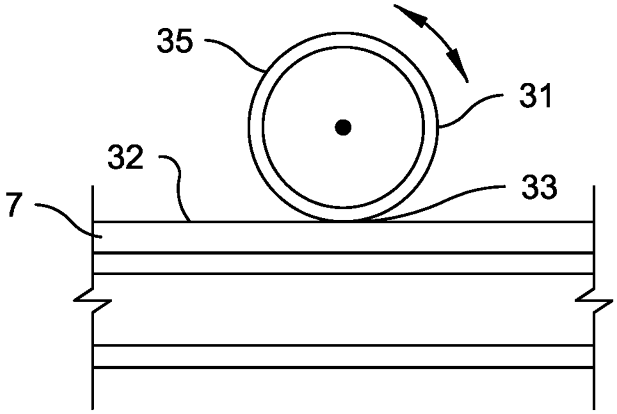
FIG. 6*b* is an enlarged schematic view illustrating contact between the motor driven trolley wheel and the rail of FIG. 6*a*.

Referring now to FIG. 6*b*, the roller surface 31 of the trolley wheel 35 contacts the bearing surface 32 along the rail 7 at the interface 33. The interface 33 and area adjacent thereto are also often subject to corrosion and other detrimental effects that may cause the trolley wheel 35 to be fixed to the rail 7 thereafter frustrating proper rolling motion by the trolley wheel 35 along the rail 7. The automated cycling or exercising by the invention avoids this problem via motion between the trolley wheel 35 and the rail 7. The frequency and extent of motion by automatic means should be sufficient to avoid an accumulation of corrosion that would otherwise fix the trolley wheels 35 to the rails 7.

Referring again to FIG. 6*b*, the hoist 8 is attached to and moves with the trolley 6. The hoist 8 includes a hoist drive motor 36 which rotates a shaft or spool allowing the cable 9 to be extended and retracted therefrom. The hoist 8, the hoist drive motor 36, and the cable 9 are also susceptible to corrosion and seizing. The frequency and extent of motion by automatic means should be sufficient to avoid an accumulation of corrosion that would otherwise prevent proper extension and retraction of the cable 9 by the hoist 8.

The automatic cycling or exercise of the crane system 1 also allows for relative motion between other moving parts within the crane system 1 thereby avoiding motion-inhibiting corrosion, and in the extreme seizing by bearings, motors, rotating elements, translating elements, and other components required for proper function of bridge 4, trolley 6, and hoist 8 via mechanical motion. It is also understood that the automatic motion by the invention may breakup and crush rust along susceptible surfaces. It is further believed that the heat generated by motors and between moving parts may also mitigate the accumulation of corrosion inducing agents and/or byproducts either directly or indirectly responsible for compromising function of mechanical and electronic components within the crane system 1. Heating effects may further avoid moisture induced short circuits and failure to circuits and other electrical components within the crane system 1.

Figure 7:
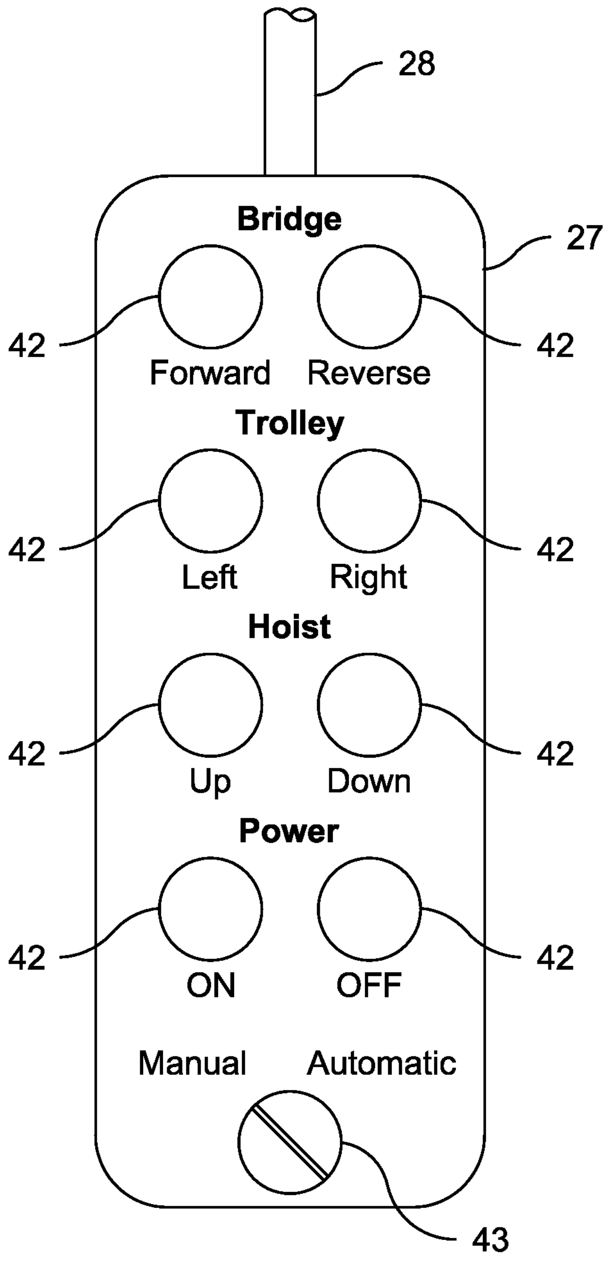
FIG. 7 is a plan view illustrating a controller for the crane system with a switch including a MANUAL mode whereby buttons on the controller enable control of bridge, trolley, and hoist and an AUTOMATIC mode whereby a control module and sensors control functionality of bridge, trolley, and hoist in accordance with an embodiment of the invention.

Referring now to FIG. 7, the manual controller 27 includes a plurality of buttons 42. The controller 27 may also include a switch 43 enabling a user to operate the crane system 1 in either a manual mode or an automatic mode. In other embodiments, the switch 43 may be located on or adjacent to the crane system 1. In preferred embodiments, the buttons 42 are functional in the manual mode and disabled in the automatic mode.

In the manual mode, the buttons 42 are operable so as to allow a user to control function of the bridge 4, the trolley 6, and the hoist 8. In some embodiments, the manual controller 27 may communicate directly with the bridge 4, the trolley 6, and the hoist 8 via a cable 28 or wireless means. In other embodiments, the manual controller 27 may communicate indirectly with the bridge 4, the trolley 6, and the hoist 8 via one or more intermediate components, such as a control module 20 (see FIG. 1) or the like. The manual mode is suitable for maintenance operations whereby the crane system 1 is utilized to lift and move equipment within the hostile environment 2. The manual mode is also suitable for repositioning the bridge 4 when the home bridge sensor 10 indicates misalignment of the bridge 4 with respect to the bridge home position 11 prior to activation of an automated cycle, or for repositioning the trolley 6 when the home trolley sensor 13 indicates misalignment of the trolley 6 with respect to the trolley home position 14 prior to activation of an automated cycle, or for repositioning the cable 9 with respect to the hoist 8 when the home hoist sensor 16 indicates misalignment of the cable 9 with respect to the hoist home position 17 prior to activation of an automated cycle.

In the automatic mode, function of the crane system 1 is determined at least in part by commands from an automated control module based on input from at least the bridge sensors 10, the trolley sensors 13, and the hoist sensors 16. The automatic mode is therefore intended to cause the bridge 4, the trolley 6, and the hoist 8 to perform a predetermined routine replicating at least in part the range of motion during normal use, such as when lifting and moving equipment in support of maintenance operations.

Figure 8:
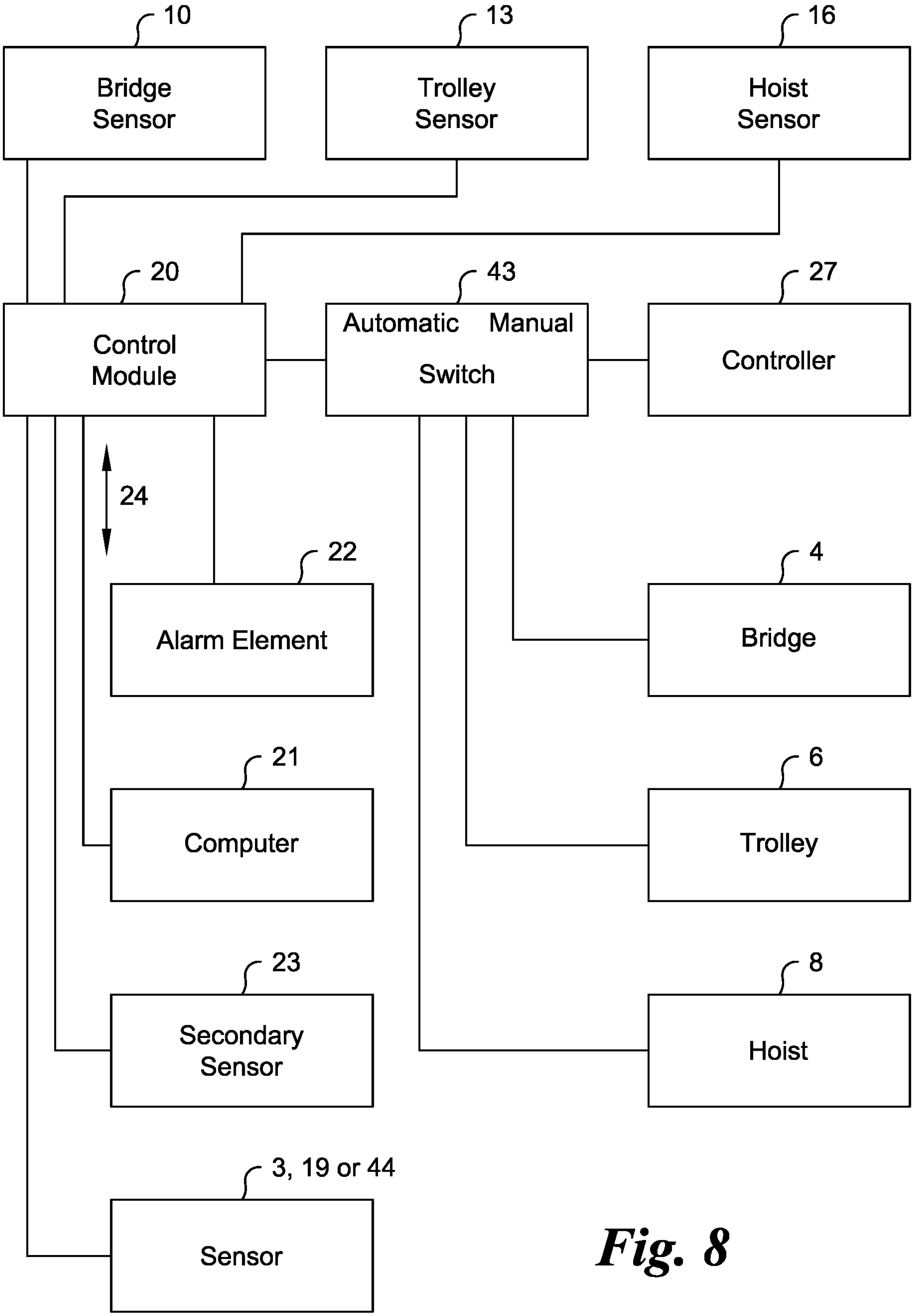
FIG. 8 is a block diagram illustrating connectivity for manual control of a crane system with bridge, trolley, and hoist via a controller or automated control of the crane system with bridge, trolley, and hoist via a control module based on sensor information in accordance with an embodiment of the invention.

Referring now to FIG. 8, components and optional components of an example crane system 1 are shown communicable via wire and wireless means. The switch 43 is communicable with the controller 27 and a control module 20. In the manual mode, the controller 27 facilities functional control of bridge 4, trolley 6, and hoist 8 via a user. In the automatic mode, the control module 20 facilitates functional control of bridge 4, trolley 6, and hoist 8 without a user. The control module 20 is also communicable with bridge sensors 10, trolley sensors 13, and hoist sensors 16. The control module 20 receives signal data from the sensors 10, 13, 16 which is used to determine start and stop function of bridge 4, trolley 6, and hoist 8. The control module 20 may be attached directly or adjacent to the crane system 1, the latter illustrated in FIG. 1.

In some embodiments, the control module 20 may be communicable with one or more optional alarm elements 22. The alarm element(s) 22 may produce visual and/or sound cues alerting persons adjacent to the crane system 1 of imminent and/or ongoing movement by the crane system 1. The alarm element(s) 22 may be attached directly or adjacent to the crane system 1, the latter illustrated in FIG. 1. The alarm element(s) 22 could be activated when bridge 4, trolley 6, or cable 9 are not properly located at the respective home positions 11, 14, 17 or when one of the bridge 4, trolley 6, or hoist 8 are actively engaged to exercise the crane system 1.

In other embodiments, the control module 20 may be communicable with a computer 21. The computer 21 may be attached directly or adjacent to the crane system 1, the latter illustrated in FIG. 1. The computer 21 could exchange data 24 with the control module 20 whereby data 24 is indicative of success or failure of crane function, functions performed by the crane system 1, location and function of the bridge 4, trolley 6, and hoist 8 based on input from bridge sensors 10, trolley sensors 13, hoist sensors 16, and optional sensors 3, 19, 44, and conditions based on input from the secondary sensors 23. The data 24 and other information may be date and time stamped. The data 24 may be communicated with or without the benefit of a network. The computer 21 could archive data 24, process data 24, and/or control function of the crane system 1 via the control module 20. Processing may include, by way of example, assessing data from one or more sensors described herein to determine the degree of present and/or future impairment to the crane system 1 by the hostile environment 2. The control module 20 or the computer 21 may communicate function commands to bridge 4, trolley 6, and hoist 8, examples including ON, OFF, start, stop, and reverse direction. In some embodiments, the control module 20 may control function of the crane system 1 separate from the computer 21.

In yet other embodiments, at least one secondary sensor 23 could gather additional data 24 from the hostile environment 2 allowing the invention to exercise the crane system 1 on an as-needed basis. The secondary sensor 23 could be mounted directly to the crane system 1 or adjacent thereto, the latter illustrated in FIG. 1. The secondary sensor 23 may gather data 24 including one or more parameters that correlate to or is/are indicative of corrosion. In one example, an electrical resistance type sensor could be used to determine resistance. In another example, a galvanic type sensor could be used to determine current or voltage. In yet other examples, the sensor could measure humidity, temperature, or concentration of a corrosive agent within the hostile environment 2. Other sensor types suitable for assessing corrosion, dust, moisture, or other parameter(s) could be utilized.

In yet other embodiments, one or more sensors 3, 19, or 44 may be communicable with the control module 20 to facilitate a change in direction to return the bridge 4 to the bridge home position 11 in FIGS. 2*a*-2*c*, the trolley 6 to the trolley home position 14 in FIGS. 3*a*-3*c*, and the cable 9 to the hoist home position 17 in FIGS. 4*a* and 4*b*.

Referring again to FIGS. 1, 2*a*-2*c*, 3*a*-3*c*, 4*a*, 4*b*, and 8, the crane system 1 is automatically exercised so that the bridge 4, the trolley 6, and a cable 9 of the hoist 8 are each separately moved and stopped based on parameters indicative of functional impairment to the crane system 1 by the hostile environment 2. The bridge 4 is moved along a pair of runway rails 5 away from a bridge home position 11, back toward a bridge end position 12, and then stopped when one bridge sensor 10 determines the bridge 4 has engaged the bridge end position 12. The trolley 6 is moved along at least one rail 7 away from a trolley home position 14, back toward a trolley end position 15, and then stopped when one trolley sensor 13 determines the trolley 6 has engaged the trolley end position 15. The cable 9 is moved away from a hoist home position 17, back towards a hoist end position 18, and then stopped when one hoist sensor 16 determines the cable 9 engages the hoist end position 18. The bridge 4, the trolley 6, and the hoist 8 are permitted to initially move at the start of the exercise cycle but only after another bridge sensor 10 determines the bridge 4 has engaged the bridge home position 11, another trolley sensor 13 determines the trolley 6 has engaged the trolley home position 14, and another hoist sensor 16 determines the cable 9 has engaged the hoist home position 17. At the start of the exercise cycle and before movement of bridge 4, trolley 6, and cable 9, the bridge 4 is returned to its bridge home position 11 when the bridge 4 does not initially engage the home bridge sensor 10, the trolley 6 is returned to its trolley home position 14 when the trolley 6 does not initially engage the home trolley sensor 13, and the cable 9 is returned to the hoist home position 17 when the cable 9 does not initially engage the home hoist sensor 16. An optional alarm element 22 may be activated whenever bridge 4, trolley 6, or cable 9 are returned to their respective home positions 11, 14, 17. In some embodiments, it may be advantageous to communicate data 24 from the bridge sensors 10, the trolley sensors 13, and the hoist sensors 16 to a control module 20 and implement the exercise cycle via the control module 20 based on the data 24. It might be further advantageous for storage and/or processing purposes to communicate the data 24 from the control module 20 to a computer 21. In other embodiments, the exercise cycle may be implement based on a predetermined time after bridge 4, trolley 6, and cable 9 were last moved.

As is evident from the explanation herein, the improvement is a crane with automated exercise means applicable, by way of non-limiting examples, to any hostile environment whereby automated cycling of a crane between uses would mitigate the detrimental effects on and to a crane by conditions within the environment. In addition to wastewater treatment facilities, the invention is appropriate for use within power generation, processing, and other industrial, commercial, and infrastructure applications.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A self-maintaining crane system within a hostile environment comprising:

(a) a hoist disposed along a trolley, a cable extendable from and retractable into said hoist; and (b) a pair of hoist sensors, one said hoist sensor determines whether said cable is positioned at a hoist home position, another said hoist sensor determines whether said cable is positioned at a hoist end position, said cable being movable between said hoist home position and said hoist end position after one said hoist sensor determines said cable being positioned at said hoist home position;

wherein:

said trolley and said hoist disposed within said hostile environment;

said cable automatically moved to minimize functional impairment of said hoist by said hostile environment;

automatic movement of said cable is contingent on a parameter indicative of functional impairment to said hoist by said hostile environment.

2. The self-maintaining crane system of claim 1, wherein said hostile environment being a wastewater treatment facility.

3. The self-maintaining crane system of claim 1, wherein said hoist functionally impaired by corrosion.

4. The self-maintaining crane system of claim 1, wherein said cable being automatically moved only after one said hoist sensor determines said cable is at said hoist home position.

5. The self-maintaining crane system of claim 1, wherein one said hoist sensor being fixed with respect to said hoist home position and said hoist end position.

6. The self-maintaining crane system of claim 1, wherein one said hoist sensor being movable with respect to said hoist home position and said hoist end position.

7. The self-maintaining crane system of claim 1, further comprising:

(c) a control module communicable with said hoist sensors wherein said control module directs start and stop function of said hoist.

8. The self-maintaining crane system of claim 7, further comprising:

(d) a computer that gathers data from at least one of said control module or said hoist sensors.

9. The self-maintaining crane system of claim 1, further comprising:

(c) an alarm element activatable when one said hoist sensor determines said cable being not located at said hoist home position.

10. The self-maintaining crane system of claim 1, further comprising:

(c) a secondary sensor which gathers data to assess impairment to said crane system by said hostile environment.

11. The self-maintaining crane system of claim 1, wherein said cable being extendable and retractable after between said hoist home position and said hoist end position.

12. The self-maintaining crane system of claim 1, wherein data from said hoist sensors being communicated to a computer.

13. The self-maintaining crane system of claim 1, wherein said parameter being time elapsed after said cable was last moved.

14. The self-maintaining crane system of claim 1, wherein said parameter being indicative of corrosion measured by a secondary sensor.

15. The self-maintaining crane system of claim 1, wherein said parameter being current.

16. The self-maintaining crane system of claim 1, wherein said parameter being voltage.

17. The self-maintaining crane system of claim 1, wherein said parameter being resistance.

18. The self-maintaining crane system of claim 1, wherein said parameter being humidity.

19. The self-maintaining crane system of claim 1, wherein said parameter being temperature.

20. The self-maintaining crane system of claim 1, wherein said parameter indicates presence of a corrosive agent within said hostile environment.

21. The self-maintaining crane system of claim 1, wherein automatic movement of said cable mechanically mitigates corrosion.

22. The self-maintaining crane system of claim 1, wherein automatic movement of said cable thermally mitigates corrosion.

* * * * *